United States Patent
Satoh

(10) Patent No.: US 6,674,488 B1
(45) Date of Patent: Jan. 6, 2004

(54) LUMINANCE AND COLOR DIFFERENCE SIGNAL SEPARATOR FOR ADAPTIVELY SELECTING COLOR DIFFERENCE SIGNALS OUTPUT FROM COMB AND LINE FILTERS

(75) Inventor: Yasunori Satoh, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 527 days.

(21) Appl. No.: 09/625,506

(22) Filed: Jul. 26, 2000

(30) Foreign Application Priority Data

Feb. 8, 2000 (JP) .......................................... 2000-30621

(51) Int. Cl.$^7$ ................................................. H04N 9/78
(52) U.S. Cl. ...................... 348/663; 348/665; 348/669; 348/670; 348/667
(58) Field of Search ................................. 348/663, 665, 348/666, 667, 668, 669, 670; H04N 9/77, 9/78

(56) References Cited

U.S. PATENT DOCUMENTS 5,285,266 A * 2/1994 Jo ............................... 348/665
5,585,861 A * 12/1996 Taniguchi et al. .......... 348/669

* cited by examiner

Primary Examiner—Sherrie Hsia
(74) Attorney, Agent, or Firm—Venable; Michael A. Sartori; Jung (John) Kim

(57) ABSTRACT

A luminance (Y) and a color difference (C) signal separator switches filters according to an image and separates a Y signal and a C signal included in a composite color picture signal to eliminate a degradation which would otherwise be involved at a transition point because of the characteristics of the filters. A first weighting circuit calculates the weighted average of the C signals extracted from the composite signal by a comb filter and a three-line comb filter. A second weighting circuit calculates the weighted average of the C signals extracted by the three-line comb filter and a two-line comb filter. When the motion level of the image exceeds a predetermined threshold, a selector selects, as the final C signal, the signal output from the second weighting circuit. When the motion level is equal to or lower than the predetermined threshold, the selector selects, as the final C signal, the signal output from the first weighting circuit.

8 Claims, 2 Drawing Sheets

Fig. 2

| CONDITIONS | MOTION LEVELS | FILTER OUTPUT 35 | FILTER OUTPUT 36 |
|---|---|---|---|
| I | VERY LOW | 10 | 0 |
| II | SLIGHTLY LOW | 8 | 2 |
| III | MEDIUM | 5 | 5 |
| IV | FAIRLY HIGH | 2 | 8 |
| V | HIGH | 0 | 10 |

LUMINANCE AND COLOR DIFFERENCE SIGNAL SEPARATOR FOR ADAPTIVELY SELECTING COLOR DIFFERENCE SIGNALS OUTPUT FROM COMB AND LINE FILTERS

BACKGROUND OF THE INVENTION

1. Field of the Invention

The present invention relates to a luminance/color-difference signal separator circuit for separating the luminance signal and the color difference signal which form the composite color picture signal representing an image.

2. Description of the Background Art

Separating the luminance signal, or Y signal, and the color difference signal, or C signal, from the composite color picture signal is a technology vital for reproducing video. There are several types of conventional luminance/color-difference signal separator circuits, or Y/C signal separator circuits. One of the types of separator circuits uses frequency separating filters for separating signals based on the frequency characteristics of the Y signal and the C signal. Another type uses comb filters for separating signals based on the frequency spectra of the signals on the horizontal scanning lines constituting a frame of image. A still another type is an adaptive Y/C signal separator circuit that detects imagewise motions or correlation levels between lines of a picture and adaptively switches filters to be used. Among those circuits, the adaptive Y/C signal separator is best in separator performance.

However, the conventional adaptive Y/C signal separator has the problems described below. A typical adaptive Y/C signal separator is adapted to determine whether or not there is a correlation between horizontal lines and, depending upon the result, switches the filter between the frequency separator filter and the comb filter. Alternatively, the adaptive Y/C signal separator is adapted to select the filter between the two-line comb filter and the three-line comb filter, depending upon a resultant correlation between horizontal lines. Further alternatively, the adaptive Y/C signal separator is adapted to determine whether or not there is a motion in the picture and, depending upon the result, switches the filter between the line comb filter and the frame comb filter. The thus selected filter causes the color difference, or chrominance, signal to be extracted. Then, the adaptive Y/C signal separator subtracts the extracted C signal from the composite signal to extract the Y signal.

However, the correlation or the motion of an actual image differs from line to line. Therefore, the adaptive Y/C signal separator including the filters adapted to be switched depending upon the results determined under the same conditions would sometimes cause an abrupt change in the filtering characteristics to prevent the image from being separated correctly. In addition, because the filters are switched from one filter to another, the filtering at the transition point of switching is not always best. This means that, even though the filter selection is adaptive, the separated Y and C signals may interfere each other so that the reproduced image is sometimes deteriorated.

SUMMARY OF THE INVENTION

It is an object of the present invention to provide a luminance/color-difference signal separator circuit with the problems described above overcome.

It is a more specific object of the invention to provide a luminance/color-difference signal separator circuit, in which the deterioration of an image that would otherwise be caused by adaptively switching filters is minimized.

In accordance with the present invention, the luminance/color-difference signal separator circuit comprises a motion detector for detecting a motion of the image and determining a motion level; a line correlation circuit for detecting a correlation level of lines of the image; a first filter for extracting the color difference signal from the composite color picture signal according to first filtering characteristics; a second filter for extracting the color difference signal from the composite signal according to second filtering characteristics different from the first characteristics; a first weighting circuit for calculating, based on the motion level, a weighted average of the color difference signal output from the first and second filters; a third filter for extracting the color difference signal from the composite signal according to third characteristics different from the first and second characteristics; a second weighting circuit for calculating, based on the correlation level, the weighted average of the color difference signal output from the second and third filters; a selector for selecting and outputting an output signal of the first weighting circuit as an ultimate color difference signal if the motion detector determines that the motion of the image is below a predetermined threshold, and, if the motion of the image exceeds the predetermined threshold, selects and outputs the output signal from the second weighting circuit as the ultimate color difference signal; and a subtracter for subtracting the ultimate color difference signal from the composite signal to produce an ultimate luminance signal, the color difference signal being selected by the selector.

This configuration allows the first filter, the second filter and the third filter to extract the color difference signal according to their own characteristics. The first weighting circuit calculates the weighted average of the color difference signal output by the first and second filters according to the motion level of the image. Therefore, the signal output from the first weighting circuit represents a signal generated by mixing the signals from the first and second filters according to the ratio or weight responsive to the motion level. Therefore, even when the motion level varies, the change in the filter characteristics affects the final color difference signal smoothly. The second weighting circuit calculates the weighted average of the color difference signal output by the second and third filters according to the correlation level of the image. Therefore, the signal output from the second weighting circuit represents a signal generated by mixing the signals from the second and third filters according to the ratio or weight responsive to the correlation level. Therefore, even the correlation level varying allows the change in the filter characteristics to less affect the final color difference signal.

If the motion of the image is below the predetermined threshold, the selector then selects the output signal from the first weighting circuit. If the motion exceeds the predetermined threshold, then the selector selects the output signal from the second weighting circuit. The signal selected by, and output from, the selector is the final color difference signal. The subtracter subtracts the obtained color difference signal from the composite signal to produce the final luminance signal. The characteristics of the second filter is adaptively reflected both on the output signal from the first weighting circuit and on the output signal from the second weighting circuit. Therefore, even when the color difference signal selected by the selector is switched, the switching is performed much smoother than when the color difference signal extracted by the first filter is switched to the color difference signal extracted by the third filter.

BRIEF DESCRIPTION OF THE DRAWINGS

The objects and features of the present invention will become more apparent from consideration of the following detailed description taken in conjunction with the accompanying drawings in which:

FIG. 2 shows a chart useful for understanding how the weighting circuit of the embodiment shown in FIG. 1 calculates a weighted average.

DESCRIPTION OF THE PREFERRED EMBODIMENTS

Figure 1:
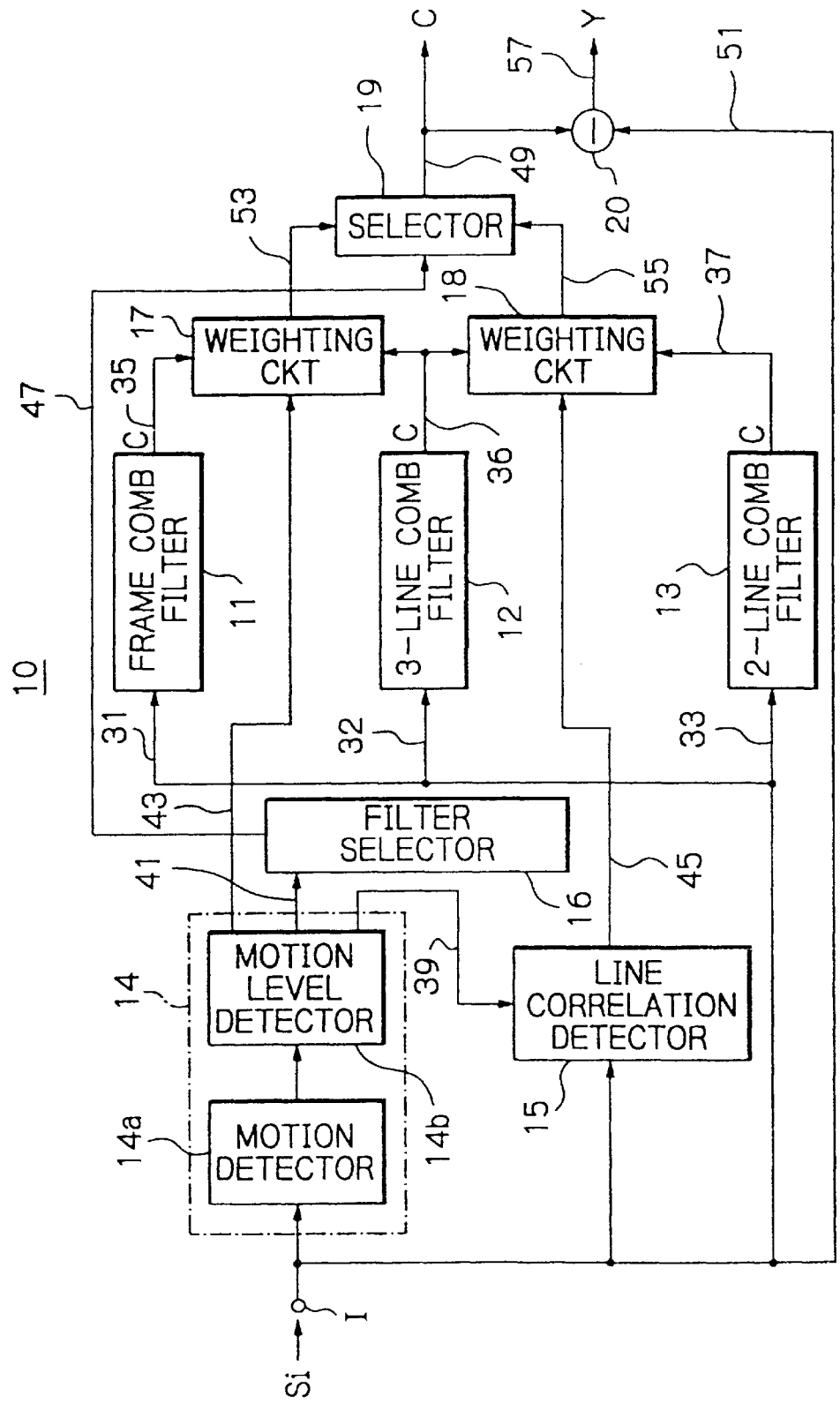
FIG. 1 is a schematic block diagram showing a preferred embodiment of a luminance/color-difference signal separator circuit in accordance with the present invention.

With reference to FIG. 1, a preferred embodiment of a luminance/color-difference, Y/C, signal separator circuit, generally denoted by a reference numeral 10, in accordance with the present invention is adapted to filter the composite color picture signal Si representing a frame of image to separate the color difference, C, signal and the luminance, Y, signal included in the composite signal Si. The Y/C signal separator circuit 10 comprises a frame comb filter 11, a three-line comb filter 12, and a two-line comb filter 13, which are interconnected as depicted in the figure. The comb filters 11, 12 and 13 have input ports 31, 32 and 33, respectively, interconnected to an input terminal I of the separator circuit 10.

The frame comb filter 11, which has its own filtering characteristics, is adapted to filter the composite signal Si on the frame-by-frame basis according to the own filtering characteristics to extract the color difference, or chrominance, signal C on its output port 35. The three-line comb filter 12 has also its own filtering characteristics, which is advantageously different from those of the frame comb filter 11. The two-line comb filter 13 is adapted to filter the signal of two horizontal lines in a frame of image based on the frequency spectrum according to the own filtering characteristics to extract the color difference signal C on its output port 37. Similarly, the three-line comb filter 12, having its own filtering characteristics, is adapted to filter the signal of three horizontal lines in a frame of image based on the frequency spectrum according to the own filtering characteristics to extract the color difference signal C on its output port 36.

Also interconnected to the input terminal I are a motion detector circuit 14, which is adapted to detect a motion of an image and determine whether or not the level of the motion is within a predetermined range, or below a predetermined threshold, and a line correlation detector 15 which functions as determining the level of correlation between lines in an image and has its input 39 interconnected to one of the output ports from the motion level detector 14b as shown. The motion detector circuit 14, composed of delay circuits for delaying the composite signal Si, storage devices and circuits associated therewith, not specifically shown, comprises a motion detector 14a which is adapted to detect the level of a motion of an image, and a motion level detector 14b which is adapted to determine the level of the motion. The line correlation detector 15, also composed of delay circuits, storage devices and associated circuits, is adapted to determine the correlation level of lines in a frame.

The motion level detector 14b of the motion detector circuit 14 has its outputs 41 and 43 interconnected to a filter selector 16 and a weighting circuit 17, respectively. As described above, the remaining output 39 of the motion level detector 14b is connected to the input port to the line correlation detector 15 to supply the latter with the enable signal. The line correlation detector 15 has its output 45 connected to the input to another weighting circuit 18.

The one weighting circuit 17 has its input interconnected to the output 35 from the frame comb filter 11, and is adapted to calculate the weighted average of the color difference signals C extracted on the connections 35 and 36 by the frame comb filter 11 and the three-line comb filter 12, respectively, based on the motion level signal 43 given by the motion level detector 14b. The other weighting circuit 18 is adapted to calculate the weighted average of the color difference signals C extracted on the connections 36 and 37 by the three-line comb filter 12 and the two-line comb filter 13, respectively, based on the correlation level signal 45 given by the line correlation detector 15.

The filter selector 16 is operative in response to a detected, resultant signal 41 from the motion detector circuit 14 to produce a selection signal 47 for selecting either of the output signals 53 and 55 from the weighting circuits 17 and 18, respectively, to be as an ultimate color difference signal C, which will be developed from the separator circuit 10. The filter selector 16 has its output 47 interconnected to another selector 19.

The latter selector 19 has its output 49, constituting the output terminal of the separator circuit 10, interconnected to one input port of a subtracter 20, which has another input port 51 interconnected to the input terminal I of the separator circuit 10. The subtracter 20 is adapted for subtracting the color difference signal C received on its one input 49 from the selector 19 from the composite signal Si received on its other input port 51 to develop the resultant, luminance signal Y on its output 57 as the ultimate luminance signal Y from the separator device 10.

With the specific embodiment, the weighting circuit 17 is adapted to calculate the weighted average under the conditions as depicted in FIG. 2, as will be described in detail with reference to the operation of the separator circuit 10.

In operation, when the composite signal Si is input on the input terminal I, the motion detector circuit 14 detects the motion level of an image in question to determine whether or not the motion level is within a predetermined range. In the description, signals are designated with reference numerals designating connections on which the signals appear. If the motion detector circuit 14 determines when the motion level is within the predetermined range such that the image in question is, or almost is, a still image, then the motion detector circuit 14 sends the detected result 41 to the filter selector 16 on one hand, and the motion level 43 to the weighting circuit 17 on the other hand. The filter selector 16 in response sends the selection signal 47 to the other selector 19 to cause the latter selector 19 to select the output signal 53 from the weighting circuit 17, the selected output signal being used as an ultimate color difference signal C separated by the separator circuit 10.

The frame comb filter 11, which has its own filtering characteristics, filters the composite signal Si according to the filtering characteristics to remove the luminance signal component from the composite signal Si in order to extract the color difference signal. Similarly, the three-line comb filter 12 has its own filtering characteristics, which may advantageously be different from those of the frame comb filter 11. The three-line comb filter 12 filters the composite signal Si according to its own characteristics to remove the luminance signal component from the composite signal Si in order to extract the color difference signal.

With reference to FIG. 2, the weighting circuit 17 calculates the weighted average of the color difference signals C output on the connections 35 and 36 from the frame comb filter 11 and the three-line comb filter 12, respectively, according to the motion level signal 43 received from the motion detector circuit 14. For example, when the motion level is very low, the weighting circuit 17 calculates the weighted average under the condition I that the color difference signal C from the frame comb filter 11 takes 10 parts while the color difference signal C from the three-line comb filter 12 is null. When the motion level is slightly high, the weighting circuit 17 calculates the weighted average under the condition II that the color difference signal C from the frame comb filter 11 takes 8 parts while the color difference signal C from the three-line comb filter 12 takes 2 parts. In the similar way, the weighting circuit 17 calculates the weighted average while gradually changing the ratio between the color difference signals C from the frame comb filter 11 and the three-line comb filter 12 according to the motion levels (conditions III and IV). When the motion level is very high, the weighting circuit 17 calculates the weighted average under the condition V that the color difference signal C from the frame comb filter 11 is zero while the color difference signal C from the three-line comb filter 12 takes 10 parts.

As understood from the above, the weighting circuit 17 has averaging weights with which the color difference signals 35 and 36 are averaged such that a heavier weight is allotted to the color difference signal 35 extracted by the frame comb filter 11 if the motion level 43 detected by the motion level detector 14 is lower, and vice versa. Accordingly, the weighting circuit 17 outputs the signal 53 to the selector 19 as if a filter that has its characteristics smoothly varying in response to the motion level were used in the separator circuit 10.

The color difference signal C on the connection 53 from the weighting circuit 17 is selected by, and output from, the selector 19, and is in turn sent to the subtracter 20. The subtracter 20 subtracts the color difference signal C, output by the selector 19, from the composite signal Si received on its other input port 51 to extract the luminance signal Y on its output 57.

When the motion level exceeds the predetermined threshold, the motion level detector 14b sends the detected result 41 to the filter selector 16, and also the enable signal 39 to the line correlation detector 15. In response to the enable signal, the line correlation detector 15 determines the correlation level between lines of the image and sends the detected result 45 to the weighting circuit 18. The filter selector 16 sends the selection signal 47 to the other selector 19 to cause the latter selector 19 to select the output signal 55 from the weighting circuit 18 so as to use the selected output signal 55 as the final color difference signal C.

At this time, the three-line comb filter 12 and the two-line comb filter 13 each filter the composite signal Si according to their own characteristics to remove the luminance signal component Y from the composite signal Si in order to extract the color difference signal C. Like the one weighting circuit 17, the latter weighting circuit 18 calculates the weighted average of the color difference signals C output from the outputs 36 and 37 of the three-line comb filter 12 and the two-line comb filter 13, respectively. By calculating the weighted average in this manner, the weighting circuit 18 outputs the signal 49 as if a filter that has its characteristics smoothly varying according to the correlation level were included in the separator circuit 10.

The color difference signal C from the weighting circuit 18 is selected by, and output from, the selector 19, and also sent to the subtracter 20. The subtracter 20 subtracts the color difference signal C, output by the selector 19, from the composite signal Si to extract the luminance signal Y on its output 57. The output signal on the output 57 will be used as an ultimate luminance signal Y separated by the separator circuit 10.

As described above, the Y/C signal separator circuit 10 in this embodiment comprises three filters, frame comb filter 11, three-line comb filter 12 and two-line comb filter 13, and the weighting circuits 17 and 18. The Y/C signal separator circuit 10 calculates the weighted average of the color difference signals C from the frame comb filter 11 and three-line comb filter 12, based on the motion level, and the weighted average of the color difference signals C from the three-line comb filter 12 and the two-line comb filter 13, based on the line-to-line correlation level. Therefore, the weighting circuit 17 outputs the signal as if the circuit were a filter that smoothly varies its characteristics according to the motion level. The transition of the signal is smoother than the conventional. Similarly, the weighting circuit 18 outputs the signal as if the circuit were a filter that smoothly varies its characteristics according to the correlation level. The transition of the signal is also smoother than the conventional. In addition, because the characteristics of the three-line comb filter 12 are reflected both on the signals 53 and 55 output from the weighting circuits 17 and 18, respectively, the transition of the signal is smooth even when the output signal 49 is switched between the weighting circuits 17 and 18. Also, switching the signal based on the predetermined threshold of the motion level advantageously allows a wider range of Y/C signal, from a fast motion video to a still image, to be separated. Furthermore with the embodiment, sharing the three-line comb filter 12 reduces the number of filters from four to three, reducing the amount of both hardware and software.

The present invention is not limited to the embodiment described above but various modifications are possible. For example, the embodiment of the Y/C signal separator circuit 10 described above comprises the frame comb filter 11, the three-line comb filter 12 and the two-line comb filter 13. Any of these filters may be replaced according to how the circuit is used. For example, the two-line comb filter 13 may be replaced with a frequency separation filter and or the like.

In summary, the Y/C signal separator circuit according to the present invention, which, for example, comprises the motion detector circuit, the line correlation detector, the comb filters each having its own characteristics, and the selectors, can separate a wider range of images from a still image to a fast video. In addition, the weighting circuits are provided. One of the weighting circuit calculates the weighted average of the color difference signal of the frame and three-line comb filters based on the motion level. The other weighting circuit calculates the weighted average of the color difference signal of the two-line and three-line comb filters based on the correlation level. This configuration smoothes the transition point of the signal generated by the characteristics of the filters. In addition, sharing the two-line comb filter for processing both a still image and a fast video allows the characteristics of that filter to be reflected on the color difference signal selected by, and output from, the selector, thus minimizing an image quality degradation at the transition of the signal.

The entire disclosure of Japanese patent application No. 30621/2000 filed on Feb. 8, 2000, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A luminance and color difference signal separator circuit for separating a luminance signal and a color difference signal which are included in a composite color picture signal representing an image, said circuit comprising:

a motion detector for detecting a motion of the image and determining a motion level of the detected motion;

a line correlation detector for detecting a correlation level of lines of the image;

a first filter having first filtering characteristics for extracting the color difference signal from the composite color picture signal according to the first filtering characteristics;

a second filter having second filtering characteristics, different from the first filtering characteristics, for extracting the color difference signal from the composite color picture signal according to the second filtering characteristics;

a first weighting circuit operative in response to the motion level determined for calculating a weighted average of the color difference signals extracted by said first and second filters;

a third filter having third filtering characteristics, different from the first and second filtering characteristics, for extracting the color difference signal from the composite color picture signal according to the third characteristics;

a second weighting circuit operative in response to the correlation level detected for calculating a weighted average of the color difference signals extracted by said second and third filters;

a selector for selecting the weighted average calculated by said first weighting circuit if said motion detector determines that the motion level of the image is below a predetermined threshold, and selecting, if the motion level of the image exceeds the predetermined threshold, the weight average calculated by said second weighting circuit, and developing the selected weighted average as an ultimate color difference signal; and a subtracter for subtracting the ultimate color difference signal from the composite color picture signal to produce an ultimate luminance signal.

2. A luminance and color difference signal separator circuit for separating a luminance signal and a color difference signal which are included in a composite color picture signal representing an image, said circuit comprising:

a motion detector for detecting a motion level of the image;

a line correlation detector for detecting a correlation level of lines of the image;

a color difference signal extractor having at least three filtering characteristics, different from each other, for extracting at least three color difference signals from the composite color picture signal in accordance with the at least three filtering characteristics to produce at least three color difference signals;

a weighting circuit for calculating weighted averages between two of the at least three color difference signals;

a selector for selecting either one of the weighted averages output from said weighting circuit as an ultimate color difference signal according to the motion level detected; and a subtracter for subtracting the ultimate color difference signal from the composite color picture signal to produce an ultimate luminance signal.

3. The signal separator circuit according to claim 2, wherein said motion detector comprises:

a motion detector circuit for detecting the motion of the image; and a motion level detector circuit operative in response to said motion detector circuit for determining the motion level.

4. The signal separator circuit according to claim 2, wherein said color difference signal extractor comprises:

a first filter having first filtering characteristics for extracting the color difference signal from the composite color picture signal according to the first filtering characteristics;

a second filter having second filtering characteristics, different from the first filtering characteristics, for extracting the color difference signal from the composite color picture signal according to the second filtering characteristics; and a third filter having third filtering characteristics, different from the first and second filtering characteristics, for extracting the color difference signal from the composite color picture signal according to the third characteristics.

5. The signal separator circuit according to claim 4, wherein said weighting circuit comprises:

a first weighting calculator for calculating, based on the motion level detected, a weighted average of the color difference signals output from said first and second filters; and a second weighting calculator for calculating, based on the correlation level detected, a weighted average of the color difference signals output from said second and third filters.

6. The signal separator circuit according to claim 5, wherein said selector selects, if said motion detector determines that the motion of the image is below a predetermined threshold, the weighted average output from said first weighting calculator, and, if the motion of the image exceeds the predetermined threshold, the weighted average output from said second weighting calculator, and outputs the selected weighted average as the ultimate luminance signal.

7. The signal separator circuit according to claim 5, wherein said first filter comprises a frame comb filter for filtering the composite color picture signal on a frame-by-frame basis according to the first filtering characteristics to extract the color difference signal;

said second filter comprising a three-line comb filter for filtering a signal of three lines of the image based on a frequency spectrum according to the second filtering characteristics to extract the color difference signal;

said third filter comprising a two-line comb filter filtering a signal of two horizontal lines of the image based on a frequency spectrum according to the third filtering characteristics to extract the color difference signal.

8. The signal separator circuit according to claim 7, wherein said first weighting calculator has averaging weights such that a heavier weight is allotted to the color difference signal extracted by said frame comb filter if the motion level detected is lower.

* * * * *